UNITED STATES PATENT OFFICE.

WILLIAM HOSKINS, OF CHICAGO, ILLINOIS, ASSIGNOR TO THE BEST BROTHERS KEENE'S CEMENT COMPANY, OF MEDICINE LODGE, KANSAS, A CORPORATION OF KANSAS.

GYPSUM PRODUCT.

1,178,016.  Specification of Letters Patent.  Patented Apr. 4, 1916.

No Drawing.  Application filed November 29, 1915.  Serial No. 64,130.

*To all whom it may concern:*

Be it known that I, WILLIAM HOSKINS, a citizen of the United States, residing at Chicago, in the county of Cook and State of Illinois, have invented a new and useful Improvement in Gypsum Products, of which the following is a specification.

My invention relates to the art of treating and preparing for commercial uses the natural substance commonly known as gypsum, and to the new physical product so prepared.

Gypsum, or hydrated calcium sulfate, has in the past been prepared and treated in various ways for different industrial uses. One common method of preparation has been to crush or grind the natural product into a fine powder, such crushed or powdered gypsum being a recognized commodity and in wide use in the art. By reason of its relatively low cost, this product has been and continues to be used in paper manufacture as a substitute for and adulterant of china clay in producing coated or surfaced printing papers. Its use in this field, however, has been limited for the reason that paper finished or surfaced with this product was noticeably inferior in uniformity, smoothness, color, and gloss to the china-clay paper, and furthermore, even where only small percentages of this powdered gypsum were used as adulterants, it was frequently noted that the finished paper exhibited minute imperfections. I have discovered that the difficulties heretofore met with in this connection are not, as has been commonly supposed, the result of any inherent inferiority of gypsum, but are in fact due solely to the methods of preparation employed and to the physical characteristics of the product resulting from such preparation. Briefly, I have discovered: That the individual particles of ground or powdered gypsum, as now manufactured, are distinctly crystalline in form; that by proper methods of preparation an exceedingly fine, velvety, amorphous product may be produced; and that this fine amorphous product exhibits none of the injurious characteristics of the crystalline product, but, in fact, is equal or superior to china-clay as a coating for paper and is further useful and far superior to the former gypsum product in various arts in which a finely-divided inert filler is required.

In preparing my new product the natural gypsum is mined, crushed in any desired form of crusher to a size suitable for introduction into a ball or pebble pulverizing mill, and is then introduced, with water, into the latter and ground while in a wet condition to an order of fineness considerably higher than that of the red corpuscles of human blood. The ground product is then separated and collected by any desired process, as, for instance, by flotation. As is apparent from the above description, the new method of preparation is simple in the extreme, and may be economically carried out on a large scale by any person skilled in the art of milling. It is not essential that any particular form of apparatus be used, nor that the operator employ any technique or steps of procedure new in themselves. The product produced by this process is an exceedingly fine, velvety, uniform, and distinctly amorphous powder. When used for coating paper it gives a surface equal in all respects to the best results obtained by china-clay and at a cost much lower than that of the latter. It also forms a desirable filler or loader for paper. I have also found that the fine, velvety, and amorphous character of the new product is so distinctly different as to make it useful in various arts for which the gypsum heretofore known was considered wholly unsuited and in which no serious attempt was made to employ this substance. For example, my new gypsum product, when blended with oil forms a putty of the highest grade, and in this use, therefore, forms a cheap and desirable substitute for whiting. When mixed with a cementitious binder, either alone or in combination with other fillers, it is useful for smooth fine-grain plastic compositions, such as are employed in molded picture-frames.

While I have, of course, been unable by actual experiment to prove beyond question the suitability of my new product for all arts and uses in which a finely-divided inert filler is employed, I believe that from the results obtained in the arts to which I have applied the product, taken together with its known characteristics and qualities, it may properly be said that there is a reasonable expectation that the product will prove to be fitted for use in every art in which a finely-divided inert filler is required. I wish it to be understood, therefore, that the foregoing examples of specific uses of my new product are intended to be illustrative and explanatory only, and are chosen only for the purpose of making my invention more clear, and that I do not regard the new product as being limited in usefulness to these specific arts and purposes.

What I claim as new and desire to secure by Letters Patent is:—

1. Gypsum in the form of a velvety amorphous hydrated powder of an order of fineness of the red corpuscles of human blood.

2. A paper-coating including a substantial proportion of particles of amorphous hydrated gypsum powder of an order of fineness equal to that of the red corpuscles of human blood.

WILLIAM HOSKINS.

In presence of—
L. HEISLAR,
A. C. FISCHER.